United States Patent [19]

Doran

[11] Patent Number: 4,570,440
[45] Date of Patent: Feb. 18, 1986

[54] ARTICULATED CONNECTOR

[75] Inventor: Daniel W. Doran, Troy, Mich.

[73] Assignee: Chrysler Corporation, Highland Park, Mich.

[21] Appl. No.: 751,104

[22] Filed: Jul. 2, 1985

[51] Int. Cl.⁴ .......................... F01N 7/10; F02B 27/02
[52] U.S. Cl. ...................................... 60/322; 285/268; 285/275; 285/279
[58] Field of Search .................. 60/322; 285/268, 275, 285/279

[56] References Cited

U.S. PATENT DOCUMENTS 3,007,720 11/1961 Breitenstein .................. 285/268
3,204,990  9/1965 Blakely ........................ 285/279
3,798,903  3/1974 Mitchell ....................... 60/322
4,188,784  2/1980 Hall ............................ 285/268
4,277,092  7/1981 Viers ........................... 285/268

Primary Examiner—Douglas Hart
Attorney, Agent, or Firm—Kenneth H. MacLean, Jr.

[57] ABSTRACT

An articulating type exhaust connector for a vehicle having a transversely mounted engine with an exhaust manifold moveable with respect to an exhaust header conduit caused by engine roll. The articulated connector includes a seating surface formed at the outlet of the manifold and a seal carried on the end of the header which engages the manifold. The end of the header and seal carried thereby is biased against the manifold by means of a flange and bolt connector and a washer type spring between the flange and the header so that the seal is pushed against the seat permitting the header and seal to articulate a substantial angular amount with respect to the manifold.

4 Claims, 3 Drawing Figures

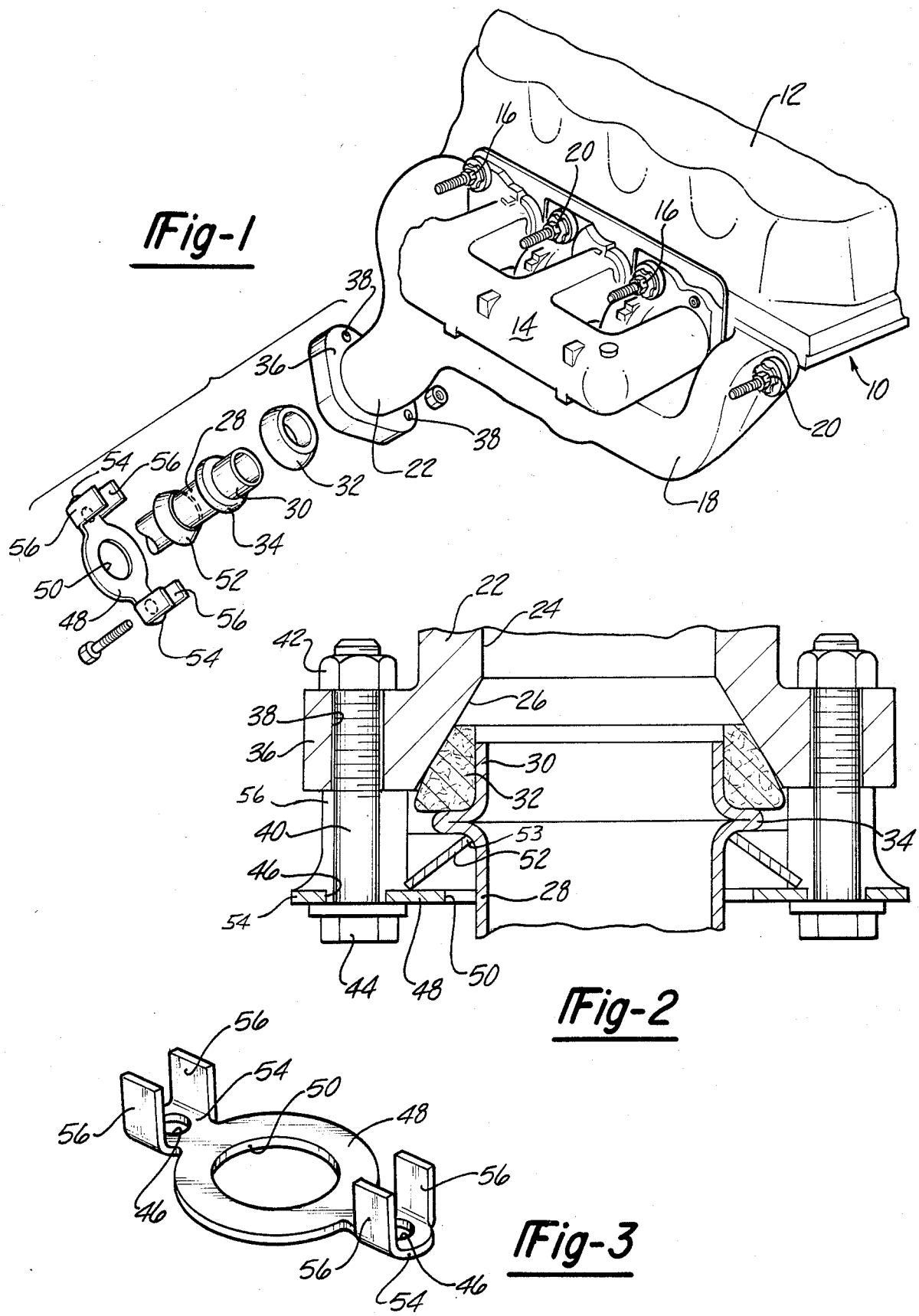

ARTICULATED CONNECTOR

BACKGROUND AND OBJECT OF THE INVENTION

This invention is an improvement over a prior invention also assigned to the present assignee and now U.S. Pat. No. 4,188,784 which issued Feb. 19, 1980.

The aforementioned patent discloses an articulating type of exhaust connector. Many of the same components are disclosed in the above-identified patent such as: a seating surface formed at the outlet end of a manifold or the like; a header carrying a seal member thereon to engage the seating surface and to direct exhaust gases from the manifold to the header in a substantially leak-resistant manner as accomplished by engagement between the seal and the seating surface. The patent exhaust connector also has a flange means spaced away from the seating surface and connected to the header. Coil-like springs engage the flange to bias the flange, header and the seal against the seating surface. The coil springs encircle bolt fasteners which extend from the manifold, through an aperture in the flange means and terminate in an enlarged head portion which engages one end of the coil spring. With this arrangement, the flange, seal and header are biased by the force of the coil springs toward the seating surface.

The exhaust connector of the aforementioned patent has worked quite satisfactorily on front-wheel drive Chrysler vehicles since about 1978. However, the coil springs are subject to aging causing a decrease in biasing capacity due primarily to exposure to the relatively high heat resulting from exhaust gases in the engine manifold. In addition, the springs are exposed on the exterior of the connector where they encircle the bolt-like fasteners holding the connector together. Thus, the springs are subject to damage from rocks or the like which may be thrown up from the road during operation of the vehicle.

The subject improved connector utilizes many of the same components as found in the aforementioned connector, but provides an improved spring means to maintain sealing contact between the seal member and the seating surface formed by the manifold or the like. Specifically, the improved connector utilizes a spring backing plate instead of a flange attached to the header. The backing plate has a central aperture encircling the header. Radially outwardly placed apertures are provided through which fastener means extend, the head portion of which engages the spring back-up plate and secures it to the manfold. The header itself has radially outwardly extending flange means to form an axial stop or seat on one side for the seal member carried on the header. The other side of the header flange forms an axial stop or surface which engages an inner diameter portion of a Belleville or washer type spring means. The outer diameter portion of the spring means engages the spring back-up plate at a location inwardly from the bolt fasteners. Further, the spring back-up plate includes normally extending tabs adjacent the aperture therethrough so that the back-up plate can be drawn toward the manifold a predetermined spacing distance which defines the desired resultant distortion of the spring as determined by the assembled spacing between the spring back-up plate and the flange means on the header.

The improved connector thus utilizes a conically shaped Belleville washer-type spring to provide the seating bias between the seal and the seating surface to ensure a relatively leak-proof articulated connection between the manifold and the header. The Belleville spring is better protected than the previous coil springs since it is located inward with respect to the bolt fasteners and is also relatively compact in dimension. Also, the relatively large surface area of the conically shaped Belleville spring tends to disperse or dissipate heat rapidly to the atmosphere. The minimal contact between the inner diameter edge of the spring and the header provides a relatively limited heat path to the spring from the header. The outer diameter edge of the Belleville spring rests against the spring back-up plate which, with its central aperture surrounding the header, but not contacting the header, does not readily pick up heat from the manifold or header. This is contrasted to the connector shown in the aforementioned patent in which the header flange which forms an axial stop for both the seal and the spring plate provides a substantial surface to transfer heat from the header to the spring. Also, as previously mentioned, the coil-type spring of the earlier patent connector is relatively exposed to damage from a number of sources, such as objects thrown up from the highway.

The use of a Belleville washer-type spring for biasing is not in and of itself new as evidenced by an earlier patent briefly described hereinafter. The connector shown in FIG. 2 of U.S. Pat. No. 3,798,903 utilized Belleville type springs labelled 76 and 94. A seal member 90 engages a flared portion 82 of a header 80. An axial limiter is provided by a flange 84 member secured to a stationary support 72 by bolt 86. The Belleville spring 94 acts directly on seal 90 and against a member 70. The second Belleville spring 76 bears against the stationary support member 72 and the intermediate member 70 to bias the whole assembly against the manifold member 24 and gasket 78.

The assembly described in the previous paragraph teaches that Belleville springs have previously been utilized in association with exhaust connectors. Important differences between the U.S. Pat. No. 3,798,903 device and the subject connector should be noted. Generally, it is unclear at best from a careful reading of the patent, whether the connector assembly is intended to accommodate any substantial articulation between exhaust components. Rather, it appears that the purpose of the connector is simply to isolate the exhaust components from a ceramic exhaust manifold. Specifically, the Belleville washer 76 is not utilized in association with the articulated connector, but instead merely seats a stationary base member 70 away from a support member 72 and against a manifold 24. The other Belleville washer 94 is utilized in a location directly between stationary member 70 and the seal itself. This arrangement has many and substantial disadvantages as opposed to the subject articulated connector. While the Belleville spring 94 of the U.S. Pat. No. 31,798,903 is well protected, it is by necessity limited in size and strength and it is also utilized in a manner subjecting it to substantial transfer of heat from exhaust gases. It is believed that a Belleville spring utilized as shown would, of necessity, have to be formed of relatively expensive high temperature materials or otherwise the spring would soon lose its resiliency and the sealing relationship of the connector would be defeated. Also, the limits of travel of the spring from an unstressed position to a stressed position appear to be unusually small.

Therefore, an object of the present invention is to provide an improved articulated type connector between exhaust system components and providing a seal carried by one exhaust component to be seated against a surface of another exhaust component by means of the bias of a conical shaped washer-type spring, the inner diameter edge portion of which only engages an exhaust component thus decreasing the heat transfer surface area of the spring.

Another object and advantage of the subject articulated connector is the provision of a seal carried by one exhaust component which is biased against the seating surface of a second exhaust component by means of a conical washer-type spring, the outer diameter edge portion of which engages a spring back-up plate having a central aperture encircling, but not engaging the header so that the spring back-up plate does not transfer a significant amount of heat from the exhaust gases to the spring.

Another object and advantage of the subject exhaust connector is the provision of an exhaust connector in which a seal is biased against one exhaust component, a conically shaped washer-type spring is engaged by edge contact only with an exhaust component and the other edge portion of the spring engages a plate not significantly contacting an exhaust component so that a minimal surface contact for heat transfer is made between the spring and a relatively hot exhaust components.

A final object and advantage of the subject exhaust connector in which a seal member is biased against a seating surface of one exhaust component arises from the use of a conically shaped washer-type spring between one exhaust component which supports the seal and a spring back-up plate which is adjustably fastened to a second exhaust component by means of bolt fasteners, the desired spacing between the back-up plate and the exhaust component establishing spring distortion and being determined by tab means on the spring back-up plate to specifically space the plate to thereby bias the conically shaped spring a desired amount.

Other objects and advantages of the subject invention of this application will be more readily apparent after a reading of the following Detailed Description of a Preferred Embodiment which are disclosed in the drawings of this application described as follows.

DESCRIPTION OF THE DRAWINGS

In the drawings:

FIG. 1 is a prospective view of a portion of the engine, including the exhaust manifold and components of the subject articulated connector shown in exploded or separated fashion to better understand the relationship between the various parts; and FIG. 2 is an elevational and sectioned view of an assembled exhaust connector; and FIG. 3 is an enlarged prospective view of the spring back-up plate shown in the other figures.

DETAILED DESCRIPTION OF THE PREFERRED EMBODIMENT

In FIG. 1 of the drawings, a cylinder head 10 of a typical automobile type engine is illustrated. The cylinder head 10 has an upper valve covered 12 which is utilized to enclose the engine's valve components such as camshaft, valve lifters, rocker arms and valve springs (not shown). These components are all well known in the engine art. The engine includes an intake manifold 14 which can be made of aluminum and is attached to the cylinder head by means of bolt and nut fasteners 16. The manifold 14 is typically a hollow tubular-type structure which extends from an air/fuel source such as a carburetor or fuel injector throttle body. The carburetor or fuel injection throttle body are not shown in the drawings as these are unrelated to the subject articulated exhaust connector and are well known in the engine art.

The engine exhaust gases are directed from the combustion chambers into an exhaust manifold 18 which, like manifold 14, is a generally tubular-like structure, but because of the high temperatures is typically of cast iron construction. The exhaust manifold is secured to the cylinder block 10 by nut and bolt fasteners 20. The exhaust manifold 18 typically includes several branches leading from individual cylinders which are connected together into a main outlet 22 which defines an exhaust outlet passage 24 as shown in FIG. 2.

The subject articulted connector includes a conically shaped seating surface 26 formed in the outlet end 22 of the manifold 18 as shown in FIG. 2. The machined surface 26 receives the end of an exhaust header tube 28 and, specifically, the inlet end portion 30 thereof. The end 30 of the header 28 carries or supports an annularly shaped seal ring 32 whose curved outer surface engages the seating surface 26. The seal ring 32 is axially restrained in the downward direction by a radially outwardly directed flange portion 34 of the header 28. A seal ring 32 itself is more specifically described in a previously issued patent also assigned to the assignee of the subject application. Specifically, reference is made to U.S. Pat. No. 4,209,177 which issued June 24, 1980.

The seal ring 32 engages the seating portion 26 and is urged upward in FIG. 2 by a connecting assembly attached to outwardly directed ears or flange portions 36 of the outlet end portion 22 of manifold 18. Specifically, apertures 38 are provided through the ears 36 and a pair of bolt fasteners 40 extend through apertures 38 and are adjustably secured relative to the exhaust manifold by nut fasteners 42. A body portion of fastener 40 extends from the outlet end 22 of manifold 18 and away from the seating surface 26. It has a conventionally shaped head portion 44 formed thereon. Adjacent head portion 44, the fastener 40 extends through an aperture 46 formed in a spring back-up plate member 48 in a rather loose fashion facilitated by the relatively large diameter of aperture 46 relative to the diameter of bolt 40. The head portion 44 of bolt 40 is sufficiently large to secure the back-up plate 48 to the outlet end 22 of manifold 18. The back-up plate also includes a central aperture of substantial diameter adapted to encircle the main body portion of header 28 with spacing between the inner edge of the spring back-up plate and the outer surface of the header 28.

A conically shaped Belleville washer-type spring 52 is placed between the flange portion 34 of header 28 and the spring back-up plate 48. The inner diameter edge portion 53 of the spring 52 engages header 28 in limited surface contact and is prevented from axial movement in an upward direction by means of the flange portion 34. The outer edge portion of the spring 52 engages the upper surface of back-up plate 48. When bolt and nut fasteners 40 and 42 are operated to draw the spring back-up plate 48 toward the outlet end 22 of manifold 18, the conically shaped spring 52 is distorted from a more relatively angulated conical shape to a more flattened assembly condition shown in FIG. 2. The distortion of the conically shaped spring 52 caused by flattening provides the upward bias of the seal 32 against the seating surface 28. This provides the nearly leakproof sealing and articulating connection between members 18 and 28.

It is desirable that the upward bias of the seal 32 and the force produced between seal 32 and seating surface 26 be limited to a desired design level so that rapid wear of the seal 32 does not result. Likewise, it is desirable that the conically shaped spring 52 be not distorted by over-flattening of the spring which could result in a decreased effectiveness in its spring function. Therefore, the backing plate 48 is provided with integral outwardly directed extensions 54 with upwardly directed tab portions 56 thereon. As shown, particularly in FIG. 3, the extension 54 provides a flat section coplanar with the central portion 48 through which the aperture 46 extends. The extension 54 also includes a pair of upwardly turned tabs 56 on either side of the aperture 46 which are adapted to extend parallel to bolt fastener 40. The upper end surface of the tabs 56 are adapted to engage the end surface of the manifold outlet portion 22 when in assembled condition as is shown in FIG. 2. Thus, the upward movement of the plate 48 is limited by the extension dimension of the tabs 56. Consequently, the flattening of the conically shaped spring 52 is limited by the design dimension of the length of tabs 56.

OPERATION OF THE CONNECTOR

In operation, the rolling action about the crankshaft axis of a transversely mounted vehicle engine produces substantial angulation between the manifold 18 and the header tube 28. During this angulation, the curved seal surface of seal 32 slides against the conically shaped surface 26 of the manifold. Simultaneously, the stressed (particlly flattened) conically shaped spring 52 follows movements of the flange portion 34 relative to the end portion 22 of manifold 18. This causes portions of the conically shaped spring 52 to move into a more flattened configuration than shown in FIG. 2, whereas an opposite side of the spring will assume a more conically oriented configuration than shown in FIG. 2. This flexing of the spring 52 is accompanied by movement of the outer diameter edge portion on the flat upper surface of the backing plate 48. Note that practically the entire surface area of the spring 52 is exposed to air for cooling whereas only a very small surface is exposed to direct heat transfer from the header tube 28. Also, the outer diameter edge portion of the conical type spring rests against the upper surface of the spring back-up plate 48 which itself does not touch the header 28 due to the relatively large diameter opening 50 therein. This relatively large diameter opening 50 is also necessary to allow the header tube 28 to angulate a substantial amount relative to the outlet end 22 of manifold 18.

Although only a single embodiment of the subject invention has been illustrated in the Drawings and described in detail heretofore, it is obvious that modifications of this embodiment may be made without falling outside the scope of the following claims which describe the invention.

I claim:

1. In a vehicle, an improved connector between the ends of two tubular exhaust components permitting relative angulation therebetween, comprising:

a seating surface formed in an end portion of one exhaust component;

an end portion of the second exhaust component having radially outwardly extending flange means formed thereon and spaced closely to the end thereof;

an annularly shaped seal ring encircling the end portion of the second exhaust component and having a surface adapted to sealingly engage the seating surface of the first exhaust member, the seal ring also engaging the radially outwardly extending flange means of the second exhaust component to prevent axial movement of the seal ring away from the seating surface;

a conically shaped washer-type spring having an outer diameter edge and an inner diameter edge encircling the second exhaust component with the inner diameter edge being axially fixed in a direction toward the valve seat surface by the flange means of the second exhaust component;

a spring back-up plate having a relatively large diameter central aperture encircling the second exhaust component without touching and having a generally flat annular surface supporting the outer diameter edge of the spring at an axial position further from the seating surface than the inner edge and the flange means;

fastener means securing the spring back-up plate in spaced relationship to the end of the first exhaust component whereby the outer edge of the spring is moved axially toward the inner edge by flattening distortion thereof to produce a sealing force between the seal ring and the seating surface of the first exhaust component.

2. In a vehicle, an improved connector between the ends of two tubular exhaust components permitting relative angulation therebetween, comprising:

a seating surface formed in an end portion of one exhaust component;

an end portion of the second exhaust component having radially outwardly extending flange means formed thereon and spaced closely to the end thereof:

an annularly shaped seal ring encircling the end portion of the second exhaust component and having a surface adapted to sealingly engage the seating surface of the first exhaust component, the seal ring also engaging the radially outwardly extending flange means of the second exhaust component to prevent axial movement of the seal ring away from the seating surface;

a conically shaped washer-type spring having an outer diameter edge and an inner diameter edge encircling the second exhaust component with the inner diameter edge being axially fixed in a direction toward the valve seat surface by the flange means of the second exhaust component;

a spring back-up plate having a relatively large diameter central aperture encircling the second exhaust component without touching and having a generally flat annular surface supporting the outer diameter edge of the spring at an axial position further from the seating surface than the inner edge and the flange means;

projections of the spring back-up plate radially and outwardly extending from the annular surface forming means with apertures therethrough;

fastener means extending from the end portion of the first exhaust component and through the apertures in the projections of the spring back-up plate;

means including the fastener means for drawing the spring back-up plate towards the first exhaust component thereby moving the outer edge of the spring axially toward the inner edge of the spring by flattening distortion thereof thereby exerting a force between the seal ring the the seating surface of the first exhaust component;

axially extending tab means from the spring back-up plate toward the first exhaust component to limit the movement of the spring back-up plate toward the first exhaust component so as to also limit the distortion of the washer-type spring to a desired amount.

3. In a vehicle having two tubular exhaust components with ends joined in sealing relation to permit relative angulation therebetween including seating surface means formed at an end portion of one exhaust component, a radially outwardly extending flange means formed on the second exhaust component, an annularly shaped seal ring encircling the end of the second exhaust component and axially fixed on the end by the flange means, and fastener means extending from the first exhaust component to a plate member encircling the second exhaust component an improved connector for the exhaust components comprising:

a conically shaped washer-type spring having an inner diameter edge which encircles the second exhaust component and bears against the flange means thereof to permit the spring flexure to bias the seal ring against the seating surface of the first exhaust component;

the conically shaped washer-type spring having an outer diameter edge portion engaging the plate member which is secured to the first exhaust component by the fastener means whereby movement of the plate member by the fastener means toward the first exhaust component produces flattening distortion of the conically shaped spring accompanied by axial movement of the outer edge of the spring in a direction toward the inner edge of the spring and the seating surface thereby exerting the spring's force through the inner edge portion to axially bias the sealing member carried by the second exhaust component against the seating surface of the first exhaust component.

4. In a vehicle having two tubular exhaust components with ends joined in sealing relation to permit relative angulation therebetween including seating surface means formed at the end portion of one exhaust component, a radially outwardly extending flange means formed on the second exhaust component, an annularly shaped seal ring encircling the end of the second exhaust component and axially fixed on the end by the flange means, an improved connector for the exhaust components, comprising:

a conically shaped washer-type spring having an inner diameter edge which encircles the second exhaust component and bears against the flange means thereof to permit the spring flexure to bias the seal ring against the seating surface of the first exhaust component;

a spring backing plate encircling the second exhaust component and with an annular flat surface;

the spring having an outer diameter edge portion supported on the plate's annular flat surface;

fastener means between the first exhaust component and the spring backing plate for moving the plate toward the end of the first exhaust component and resultantly tending to flattenly distort the conically shaped spring thereby producing a spring force on the second exhaust component and the seal tending to urge the seal against the seating surface;

the spring backing plate having integral tab portions bent to extend in parallelism with the fastener means to operatively engage the first exhaust component and establish a desired spacing between the backing plate and the first exhaust component.

* * * * *